No. 824,986. PATENTED JULY 3, 1906.
B. B. JENKINS.
CAR FENDER.
APPLICATION FILED SEPT. 27, 1905.
2 SHEETS—SHEET 1.
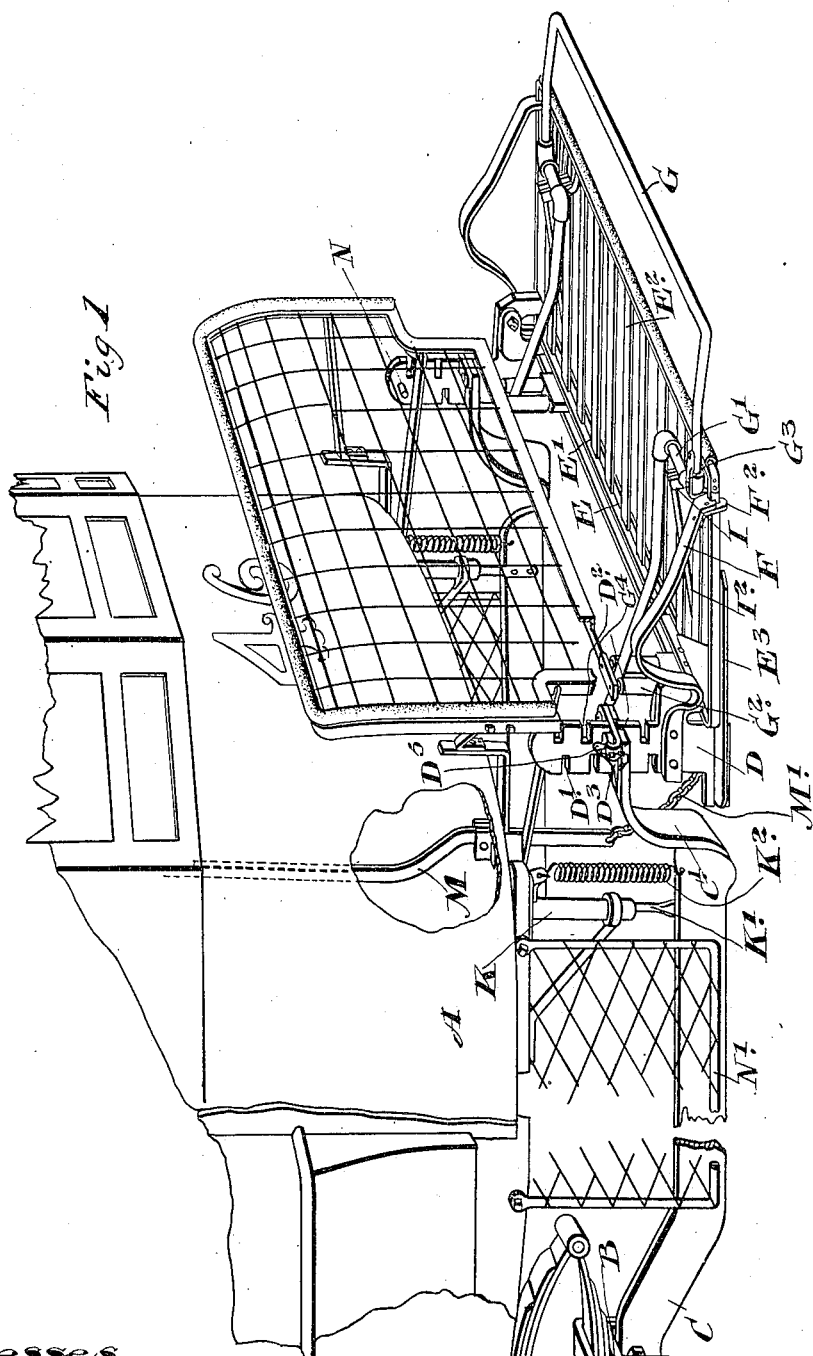

No. 824,986. PATENTED JULY 3, 1906.
B. B. JENKINS.
CAR FENDER.
APPLICATION FILED SEPT. 27, 1905.
2 SHEETS—SHEET 2.
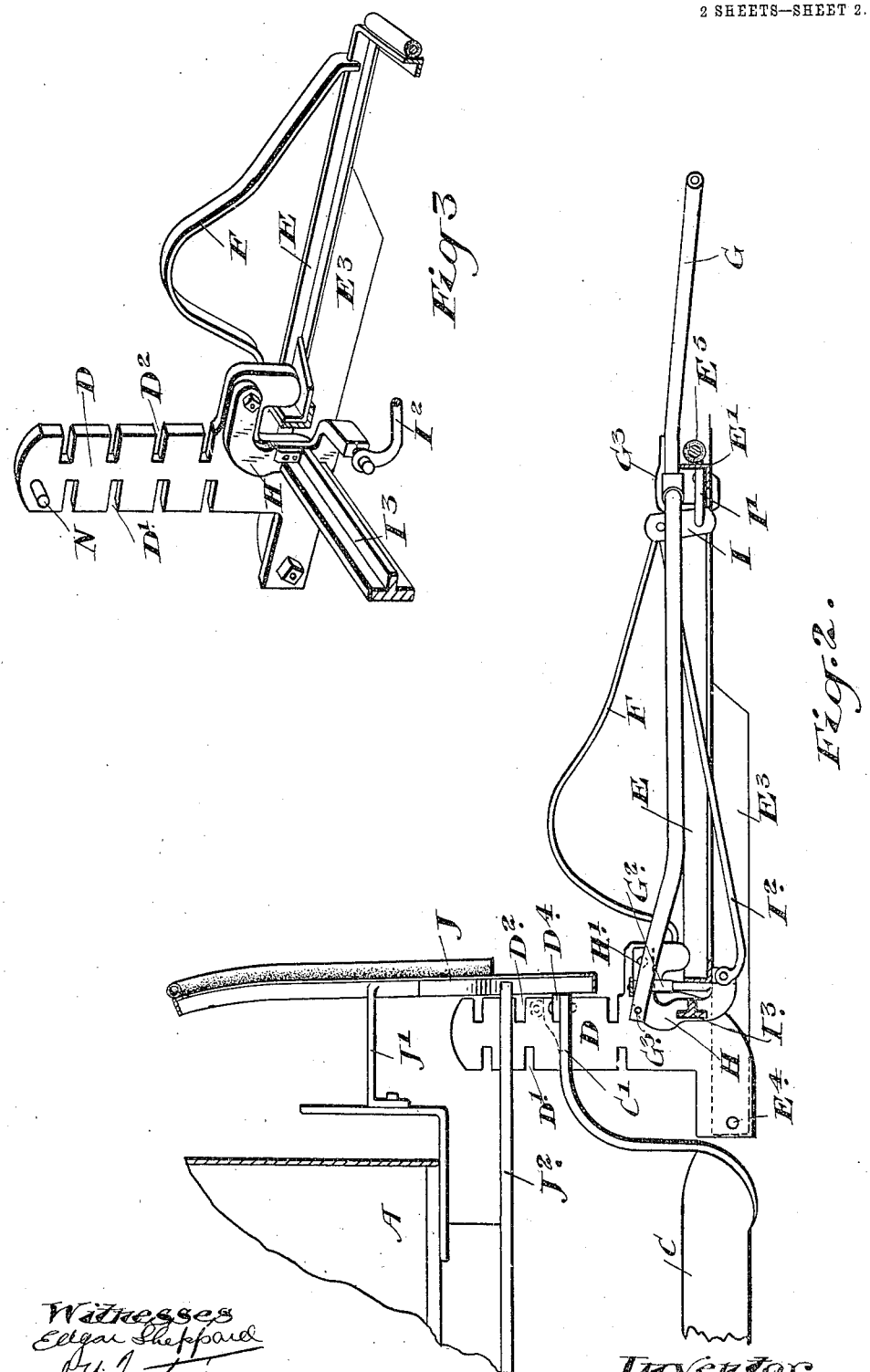

UNITED STATES PATENT OFFICE.

BENJAMIN BARNARD JENKINS, OF TORONTO, CANADA, ASSIGNOR TO JENKINS AUTOMATIC FENDER COMPANY, LIMITED, OF TORONTO, CANADA, A CORPORATION OF ONTARIO.

CAR-FENDER.

No. 824,986.     Specification of Letters Patent.     Patented July 3, 1906.

Application filed September 27, 1905. Serial No. 280,360.

*To all whom it may concern:*

Be it known that I, BENJAMIN BARNARD JENKINS, of the city of Toronto, in the county of York, in the Province of Ontario, Canada, have invented certain new and useful Improvements in Car-Fenders, of which the following is a specification.

My invention relates to improvements in car-fenders; and the object of the invention is to provide a simple, cheap, and quickly-operating automatic fender; and it consists, essentially, of a cradle pivotally connected to detachable hangers secured to arms extending from the truck of the car, suitable springs designed to have a downward pressure upon the outer end of the fender, a substantially U-shaped frame capable of rearward movement and designed to rest on the cradle forming the body of the fender and to extend forwardly thereof, suitable guideways for the same, a trip device designed to support the cradle in its normal position and to be relieved by the rearward movement of the U-shaped frame, all the parts being arranged and constructed in detail, as hereinafter more particularly explained.

Figure 1 is a general perspective view of a fender attached to a single-truck car. Fig. 2 is an enlarged longitudinal section through Fig. 1. Fig. 3 is a detail view of the trip device.

In the drawings like letters of reference indicate corresponding parts in each figure.

A is the front portion of a single-truck car.

B is a portion of the truck.

C represents arms secured to and extending forwardly from the truck and provided with a forked upturned notched end $C'$.

D represents hangers having notches $D'$, designed to engage with the notch $C'$.

$D^2$ represents notches formed in the opposite side of the hanger D upon a higher plane than the notches $D'$.

$D^3$ is a supplemental fork forming part of the bar C.

$D^4$ is a pivoted locking-piece designed to enter the notches $D^2$ and fork $D^3$ and to be held therein by a pin $D^5$, extending through the fork.

E is the cradle or body of the fender, formed of the angle-bar frame $E'$ and cross-slats $E^2$.

$E^3$ represents bars extending rearwardly from the table and pivoted on the hangers D by the bolts $E^4$.

$E^5$ is a rubber cushion-roll to prevent injury to the bodies coming in contact therewith.

F represents springs secured to the hangers D and designed to extend forwardly and downwardly onto the front of the fender, so as to press the same with sufficient force upon the track when relieved and hold such cradle in place when down to prevent any body getting beneath the fender. The end of the spring is notched so as to fit over the frame of the fender and is provided with the hooked extension-piece $F^2$, designed to extend beneath and around the frame.

G is a frame substantially U-shaped in form, the arm of the frame having an inward jog, forming a shoulder $G'$. The inner ends of the arms are designed to extend between the vertical guiding-rollers $G^2$.

$G^3$ is a cross-bolt extending through the arm and designed to prevent the full withdrawal of the arms of the frame from between the rollers.

$G^4$ is a hook secured to the U-frame and designed to extend down beneath the cradle of the fender to hold the U-frame in place when in operative position and to prevent it raising until pushed back far enough to release the trip.

$G^5$ represents rods connecting the frames of the rollers $G^2$ together to stiffen their bearings.

H is a gravity-trip pivotally secured to the hanger D by bolts $H'$ and designed normally to extend down and beneath the fender to support it in its raised position.

I is a pivoted arm held in the U bracket-bar $I'$ and extending upwardly behind the shoulder $G'$.

$I^2$ is a link-bar connecting the arm I with the gravity-trip H.

$I^3$ is a T angle-bar connecting the trip-arms together to insure of their working in unison.

J is a guard for the front of the car and secured thereto by brackets $J'$ and $J^2$.

In a single-truck car to prevent the oscillation thereof affecting the fender I provide the following means of connecting the fender to the body: The arms C are connected to the truck, as already described. K is a tubular socket secured to and extending down from the floor of the car. K' is a vertical bar secured to the arm C and designed to extend up loosely into the tubular socket K, and K² is a tension-spring extending between the arm C and the body of the car to relieve the arms of a portion of the weight of the fender. By this means a flexible though strong support is formed for the fender. M is a lever pivoted in brackets inside the vestibule of the car and extending through the floor thereof. M' is a chain connecting the lower end of the lever with the trip-arm. N represents side guards secured to the body of the car.

Having described the principal parts involved in my invention, I shall now briefly describe the operation of the same.

An obstruction on the track striking the frame G forces it rearwardly between the guide-rollers G². By this rearward movement the shoulders G' are brought into contact with the arm I, which is forced backwardly and by the connecting link-bar I² until the trip H is forced from beneath the fender, the hook G⁴ preventing the frame G from rising. The springs then operate to force the fender immediately upon the track and to hold it there. It will be seen that by reason of the frame G extending forwardly of the cradle that as soon as it is struck the cradle is relieved before the obstructing object has any chance to reach it, this insuring it being caught by the cradle and obviating any danger of it passing beneath the fender. By the use of springs such as I have described the fender is forced positively to the ground and is so held there. The fender may be tripped by hand, foot, or knee, if necessary, by the use of the lever M.

If the fender is used for a double-truck car, the outer end of the portion C is secured rigidly to a suitable bracket bolted to the body of the car.

If it is desired to fold the fender, all that is necessary is to withdraw the pins D⁵, swing the locking-pieces D⁴, withdraw the hangers D out of the notch C' of the arm C, and allow the pins N, extending from the hangers, to rest in the upturned portion of the arm, so as to form the pivot or hinge. The fender is then folded up against the car and fastened by any suitable device. The notches D' and D² allow of the fender being adjustably secured to suit the different conditions of the track.

From this description it will be seen that I have constructed a very simple fender which will be very efficient as a life-saving device by reason of the object striking it and releasing it before it has actually reached the fender proper.

What I claim as my invention is—

1. In a life-saving device for cars, the combination with the truck, of the car, arms extending forwardly from the truck, of a fender pivotally supported between the arms, pressure-springs designed to bear upon the top of the fender, a frame resting on and extending forwardly of the fender, a trip-arm designed to support the fender and to be relieved by the rearward movement of the frame, as and for the purpose specified.

2. In a life-saving device for cars, the combination with the truck and body of the car, of arms extending forwardly of the truck, a fender pivotally supported between the arms pressure-springs designed to bear upon the top of the fender, a tension-spring extending between the arm and the body of the car, a tubular guiding-socket depending from the car, a rod secured to the supporting-arm and extending up into the socket, a trip device for supporting the fender, a frame resting on and extending forwardly of the fender and designed to operate the trip device upon its rearward movement, as and for the purpose specified.

3. In a life-saving device for cars, the combination with the supporting-arms attached to the car, the pivotally-supported fender and the pressure-springs, of a frame designed to be slidably held on the fender and a trip device consisting of a gravity-arm designed to extend down and beneath the rear of the fender, a pivoted arm connected to the front of the fender against which the said frame is designed to come in contact and a link connecting the gravity-arm with the pivoted arm, as and for the purpose specified.

4. In a life-saving device for cars, the combination with the supporting-arms attached to the car, the pivotally-supported fender and the pressure-springs, of a U-shaped frame designed to be slidably held on the fender and having a jog in the arms forming shoulders, a trip device consisting of a U-shaped gravity locking-piece having one arm pivotally connected to a stationary portion of the frame, and having the other arm extending beneath the fender, and an arm pivotally connected to the front of the fender and a link-bar connecting such arm with the lower arm of the gravity locking-piece as and for the purpose specified.

5. In a life-saving device for cars, the combination with the supporting-arm having a notch therein, a hanger having notches designed to engage with the notch in the arm, and having notches located on the opposite side of the hanger, a locking-piece pivoted at one side of the notch in the supporting-arm and designed to be swung over the notches so as to enter the notch in the hanger, and a holding-pin for the same, a fender pivotally connected between the hangers, pressure-springs for the same, a trip device and a frame extending over the fender designed to operate the trip device by its longitudinal movement as and for the purpose specified.

6. In a life-saving device for cars, the combination with the pivotally-supported cradle, spring for operating the same and the trip-arm for supporting the cradle, of a lever extending down through the floor of the car and flexible connection between the lower end of the lever and the trip-arm, as and for the purpose specified.

BENJAMIN BARNARD JENKINS.

Witnesses:
    B. BOYD,
    E. McEACHERN.